Nov. 4, 1941.   W. H. KUNER   2,261,477
ELECTRIC MOTOR
Filed Nov. 7, 1938
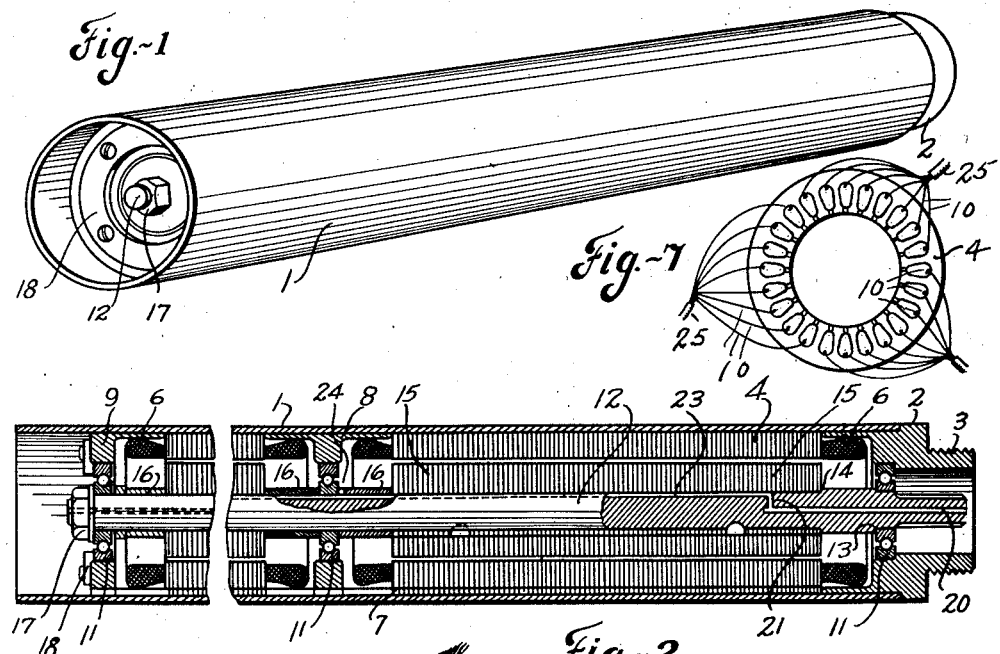
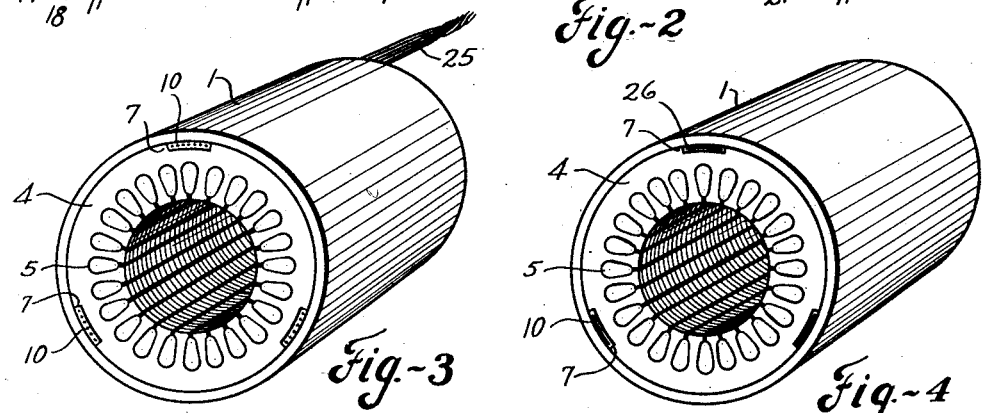
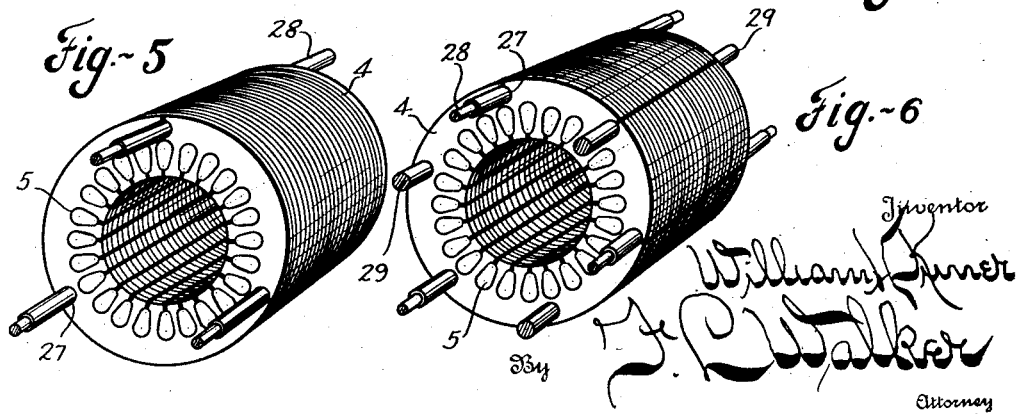
Inventor
William Kuner
By F. L. Walker
Attorney Patented Nov. 4, 1941

2,261,477

UNITED STATES PATENT OFFICE 2,261,477

ELECTRIC MOTOR

William H. Kuner, Vandalia, Ohio, assignor to The Master Electric Company, Dayton, Ohio, a corporation of Ohio Application November 7, 1938, Serial No. 239,205

6 Claims. (Cl. 172—36)

This invention pertains to electric motors, and more particularly to an elongated motor assembly of relatively small diameter, adapted for insertion in well casings and other restricted operating spaces. The construction is also capable of use for self-contained motor actuated drums and rollers for various purposes.

In the herein disclosed embodiment of the invention, succeeding groups of stator laminations are relatively spaced in axially aligned relation alternately with interposed spaced bearing mountings for a common rotor shaft and the entire assembly and all electrical connections are enclosed in a tubular sleeve or casing of relatively small diameter in proportion to its length.

The object of the invention is to simplify the construction as well as the mode of assembly and electrical connection of such motors whereby they may not only be economically manufactured, but will be more efficient in use, of increased power proportionate to their size, of compact form, and having completely enclosed parts and connections.

A further object of the invention is to provide an elongated enclosed motor assembly having multiple stator elements electrically connected in parallel or in series.

A further object of the invention is to provide an elongated motor assembly wherein the rotor shaft is medially supported within the casing independently of the stator member.

A further object of the invention is to provide enclosed electrical connections between succeeding sections of the assembly.

A further object of the invention is to provide improved lubricating means for such elongated enclosed motor assembly.

A further object of the invention is to provide means for insuring assembly of parts in their proper relation.

A further object of the invention is to provide an elongated motor assembly of relatively small diameter possessing the herein mentioned features of construction and inherent meritorious characteristics.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the acompanying drawing, wherein is illustrated the preferred but obviously not necessarily the only form of embodiment of the invention, Fig. 1 is a perspective view of the assembled motor.

Fig. 2 is a longitudinal sectional view partly broken away.

Figs. 3 and 4 are perspective views of fragmentary portions of the motor stator illustrating different modes of electrical connection.

Figs. 5 and 6 are detail perspective views of portions of the stator assembly illustrating different modes of mechanical and electrical interconnection.

Fig. 7 is a detail view illustrating distribution of the conductor cable strands in the stator winding slots.

Like parts are indicated by similar characters of reference throughout the several views.

Referring to the accompanying drawing, 1 is a tubular sleeve or casing of relatively small diameter, which may be of any desired length, within which the entire motor assembly is contained. Fixedly secured by either welding or screw-threading in one end of the casing is a head 2, which may be suitably shaped to accommodate the motor to various conditions of use or to different modes of mounting. That illustrated is provided with a screw-threaded hub 3 for connection with a continuing conduit or other mounting. Assembled by press fit within the tubular casing are plural stator sections, each comprising a group of stator laminations 4, or disks, having therein customary registering slots 5 to receive field or stator windings 6. The stator disks are further provided with registering peripheral notches 7, affording passages intermediate the stator member and casing for electrical conductors which are inserted before assembly of the stator members in the casing. There may be any number of such groups of stator laminations and the stator groups may be of greater or less extent.

For illustrative purposes only, two such stator sections have been shown. Intermediate succeeding stator sections, and having press fit engagement within the tubular casing 1 independently of the stator members, are annular bearing mountings 8. Since only two stator sections have been illustrated, only one such intermediate bearing mounting is shown. It is to be understood, however, that as the number of stator sections is increased, the number of interposed bearing mountings is also increased.

At the opposite end of the casing 1 is a second head 9 pressed within the casing and preferably secured by welding, but which may be held by screw-threading, pinning or otherwise. The successive groups of stator laminations and interposed bearing mountings are subjected to axial pressure intermediate the heads 2 and 9, thus affording a solid unitary assembly. The conductors 10 disposed in the passages formed by the peripheral notches of the lamination disks connect the successive sections of the stator either in parallel or in series, as may be desired. The casing heads 2 and 9 and also the intermediate bearing mounting 8 are provided with anti-friction bearings 11, which may be of any suitable type, either ball or roller bearings.

Mounted in the bearings 11 is a rotor shaft 12, formed at one end with a peripheral enlargement affording relatively spaced oppositely disposed shoulders 13 and 14. The shoulder 13 affords an abutment for the inner race member of the bearing 11 with which it has axial thrust engagement. The companion shoulder 14 affords an abutment or stop for the rotor laminations 15 which are strung upon the shaft 12 and keyed thereto for unison rotation. The rotor laminations 15 are assembled on the shaft 12 in groups or sections, each substantially co-extensive with the corresponding sections of the stator assembly. Intermediate succeeding rotor lamination assemblies are interposed the inner race member of the medial bearing 11 and on opposite sides thereof spacer sleeves 16 which abut upon the intermediate bearing member and the spaced rotor lamination groups to maintain them in properly spaced relation. At the opposite end of the shaft 12 there is provided thereon a further spacer sleeve 16 and the inner race member of the final bearing 11, beyond which the shaft carries a compression nut 17 by which the several groups of rotor laminations and the alternating spacer sleeves and bearing members are subjected to axial compression upon the shaft into a solid unit.

The opening within the stator assembly being somewhat larger than the diameter of the bearings, the entire rotor assembly can be easily inserted within the stator assembly from the end opposite the casing head 2. The casing head 2 is rabbeted at its inner side to receive the terminal bearing member 11, the outer race member of which abuts thereon. The remaining bearings 11 have close slip-fit engagement within the intermediate mounting 8 and opposite terminal head 9. A stop collar 18, secured to the terminal head 9 either by screw-threading or by attachment screws, limits the end play of the rotor and bearing assembly and maintains it in its adjusted relation with the stator assembly.

To afford ample lubrication, especially to the intermediate bearings, which are not conveniently accessible for such purpose, the shaft is longitudinally bored at each end for short distances as at 20. These terminal bores communicate through short transverse bores 21 with one or more longitudinal grooves 23, closed exteriorly of the shaft by the rotor laminations, the spacer sleeves, and bearing members. Discharge openings 24 contiguous to the bearings permit lubricant flow from the channel 23 to the bearings. In lieu of such opening 24, a porous insert may be provided through which lubricant may leak to the bearing.

It is obvious that the motor may be extended to any length and may include any number of stator and rotor sections electrically connected either in series or in multiple. If the shaft is too long for economical manufacture, it also may be formed in sections and axially joined one to another by suitable driving couplings.

If the successive stator sections are electrically connected in series, to compensate for voltage drop it is necessary that successive portions of the motor be differently wound. It is therefore desirable, although not necessary, that they be interconnected in multiple. Furthermore, if connected in multiple, failure of one section will not necessarily destroy the motor operation, since it will continue to operate with one section dead.

Since in the present instance it is desirable to keep the diameter of the assembly as small as possible, there are wiring difficulties incident to parallel connection to be overcome. To provide holes through the stator laminae reduces the amount of iron and may interrupt the path of the flux and, in any event, reduces the efficiency. Hence, in the present instance the connector passages are made quite shallow and are located in the peripheries of the stator laminae adjacent the casing. Such connector passages are formed by the registry of the notches 7 of succeeding laminae and are substantially equally spaced circumferentially of the assembly. In Fig. 3 there are shown multi-strand conductor tapes 25 having the desired number of leads, disposed in the longitudinal passages intermediate the stator and casing, provided by registering notches 7 in the peripheries of the stator laminations. However, in lieu of stranded conductors, such connections may comprise flat conductor strips 26 disposed in the passages 7 as shown in Fig. 4. Such strips are electrically insulated from the stator laminae and from the casing. In either form of embodiment there is minimum interruption of the stator and a maximum amount of stator iron remains.

If the conditions of operation are such that one or more holes may be provided in the stator laminae without materially affecting the motor for the purpose for which it is designed, registering holes 27 may be provided in the stator laminae through which electrically insulated conductor rods or wires 28 may be extended.

Whether the stator sections are electrically connected in series or in parallel, the laminae of each section may be pre-assembled and clamped together by tie rods extending through holes 27 in the laminae, and either riveted or provided with screw-threaded clamp nuts. Such construction affords solid units which facilitate assembly into the casing. In such event, the tie rods, if insulated, may duo-functionally serve also as electrical conductors. Such construction is shown in Fig. 5. In Fig. 6 there is shown a further modification wherein both tie rods 29 and electrical conductors 28 are separately employed, both being disposed through registering holes 27. The connector rods may be common to a plurality of stator sections or each section may have its own separate rods. The details of construction herein set forth enables a wide range of variation, and sundry combinations of parts both mechanically and electrically may be achieved.

The present assembly comprises in effect a series of individual motor units arranged in an axially aligned succession, wherein each stator unit is provided with its own set of windings. The assembly may be extended to considerable length. Such assembly may contain a relatively large number of sections or units. This has the advantage that one, two, or more sections might fail without seriously interfering with the successful operation of the remainder of the assembly. This is especially desirable in deep well operation, since it obviates necessity of pulling the entire string of piping due to a single failing section. One practical embodiment of the present motor assembly which was less than four inches in diameter and twenty-seven feet long, was installed in an oil well approximately seven thousand feet below the surface of the ground, where it drove a pump to expel crude oil from the well. Many other applications are possible, not only for deep well operation, but for motor operation in other restricted localities.

By fixedly holding the shaft 12 against rotation, the casing and stator may be made to rotate relative to the shaft. It thus affords a self-contained motor roller, which, however, will revolve at a relatively high speed.

In lieu of employing a stranded conductor cable 25, the strands of which are flattened into the shallow passage formed by the marginal recesses 7, the recesses may be omitted and the respective strands of the cable may be extended through the winding slots of the stator laminations in addition to the usual coil windings. Assuming that the stator laminations are formed with twenty-four winding slots, and three conductor cables are required, by making each cable of eight strands the strands may be distributed one in each winding slot as shown in Fig. 7. While the stator slots would not accommodate an entire conductor cable in a single slot, the individual strands being relatively small size may be distributively disposed in different slots in addition to the windings therein without difficulty.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An electric motor assembly including an elongated tubular casing, a plurality of groups of annular stator laminae therein, bearing mountings interposed between the successive groups of stator laminae and at opposite ends of the plurality, the stator laminae having registering notches therein which extend through their peripheries and which are closed at their open ends by the inner wall of the tubular casing thereby to form passageways by and between the notches and the said inner wall of the casing, electrical conductors extending through the passageways so as to be housed by and between the walls defining the notches and the inner wall of the casing and being retained within said notches by the latter, said conductors electrically connecting the respective groups of stator laminae with each other, a rotor shaft, a plurality of groups of rotor laminae thereon corresponding to the groups of stator laminae, bearing elements interposed between the successive groups of rotor laminae and at opposite ends of the plurality thereof, said bearing units being of less diameter than the internal diameter of the annular stator laminae and freely insertable through the central opening of the assembled stator laminae into engaging relation within the bearing mountings intermediate successive groups of stator laminations.

2. An electric motor assembly including an elongated tubular casing, and alternating groups of annular stator laminae and bearing mountings within the casing, a coacting rotor including a shaft and alternating groups of rotor laminae and bearing units upon the shaft, the bearing units upon the shaft being engageable in the bearing mountings within the tubular casing, longitudinal passages formed by and between the peripheral edges of the laminae and the inner wall of the casing, and electrical conductors within the passages housed by and retained within said passages by the inner wall of the casing and which conductors electrically interconnect the groups of stator laminations with each other.

3. An electric motor rotor, a shaft having a peripheral shoulder, a plurality of groups of rotor laminae and bearing units assembled in alternating relation on the shaft, spacer sleeves interposed between the groups of rotor laminae and the bearing units, and a compression nut on said shaft subjecting the assembly of rotor laminae, bearing units and interposed spacer sleeves to axial compression against the peripheral shoulder of the shaft.

4. In an electric motor or generator the combination with an alternating continuous succession of laminated stator assemblies and bearing mountings, independent sets of windings for the respective laminated stator assemblies, a rotor shaft, an alternating continuous succession of groups of rotor laminations and bearing units carried thereby, the groups of rotor laminations being disposed in coacting relation with the respective groups of stator laminations, and the bearing units being engageable in the bearing mountings intermediate successive stator lamination assemblies, the bearing mountings being so constructed and arranged as to space the succession of laminated stator windings and provide pockets for receiving the independent sets of windings.

5. An electric motor assembly including an elongated tubular casing, a plurality of groups of annular stator laminae therein, bearing mountings interposed between the successive groups of stator laminae and at opposite ends of the plurality and acting as spacers for the groups of stator laminae, registering indentations in and extending through the peripheries of the stator laminae and forming closed passages with the inner wall of the casing, electrical conductors extending through the passages thereby to be housed by and between the stator laminae and the inner wall of the casing and retained within said indentations by said wall of the casing, said electrical conductors electrically connecting respective groups of stator laminae with a source of electrical current supply and with each other, a rotor shaft, a plurality of groups of rotor laminae thereon corresponding to the group of stator laminae, bearing elements interposed between the successive groups of rotor laminae and at opposite ends of the plurality thereof, said bearing units being of less diameter than the internal diameter of the annular stator laminae and freely insertible through the central opening of the assembled stator laminae and into engaging relation with the bearing mountings, and means for lubricating the bearing units including a longitudinally extending groove in the periphery of the shaft adapted, with the rotor laminae, to form a lubricant passage, relatively short counterbored passages in each end of the shaft having lubricant conducting connection with the groove in the shaft, one of said counterbored passages receiving lubricant from a source of supply, and the said passages having lubricant supply connection with the bearing elements.

6. In an electrical motor rotor, a shaft having a peripheral shoulder, a plurality of groups of rotor laminae and bearing units alternately assembled on the shaft, spacer sleeves interposed between the groups of rotor laminae and the bearing units, and compression means on said shaft subjecting the assembly of rotor laminae, bearing units, and interposed spacing sleeves to axial compression against the peripheral shoulder of the shaft.

WILLIAM H. KUNER.